(12) United States Patent
Yuan et al.

(10) Patent No.: US 11,904,463 B2
(45) Date of Patent: Feb. 20, 2024

(54) PLASTIC ROBOT ARM LINK, ASSOCIATED ROBOT AND MANUFACTURING METHOD

(71) Applicant: ABB Schweiz AG, Baden (CH)

(72) Inventors: Feihu Yuan, Shanghai (CN); Hao Gu, Shanghai (CN); Wei Song, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 125 days.

(21) Appl. No.: 17/624,522

(22) PCT Filed: Jul. 30, 2019

(86) PCT No.: PCT/CN2019/098396
§ 371 (c)(1),
(2) Date: Jan. 3, 2022

(87) PCT Pub. No.: WO2021/016868
PCT Pub. Date: Feb. 4, 2021

(65) Prior Publication Data
US 2022/0241958 A1   Aug. 4, 2022

(51) Int. Cl.
*B25J 9/00* (2006.01)
*B25J 19/00* (2006.01)

(52) U.S. Cl.
CPC ........... *B25J 9/0012* (2013.01); *B25J 19/007* (2013.01)

(58) Field of Classification Search
CPC ..... B25J 9/0012; B25J 18/00; B29C 45/1671; B29C 2045/1673
See application file for complete search history.

(56) References Cited

U.S. PATENT DOCUMENTS

| | | | |
|---|---|---|---|
| 2018/0290293 A1* | 10/2018 | Nakayama | B25J 9/0012 |
| 2019/0118393 A1 | 4/2019 | Browne et al. | |
| 2020/0030964 A1* | 1/2020 | Nakayama | B25J 9/0012 |
| 2020/0171720 A1* | 6/2020 | Nakayama | B29C 45/14065 |

FOREIGN PATENT DOCUMENTS

| | | |
|---|---|---|
| CN | 2765739 Y | 3/2006 |
| CN | 206383137 U | 8/2017 |
| CN | 109696567 A | 4/2019 |

(Continued)

OTHER PUBLICATIONS

International Search Report and Written Opinion, issued by the ISA/CN National Intellectual Property Administration, regarding corresponding patent application Serial No. PCT/CN2019/098396; dated Feb. 19, 2020; 8 pages.

*Primary Examiner* — Jake Cook
(74) *Attorney, Agent, or Firm* — Greenberg Traurig, LLP

(57) ABSTRACT

A plastic robot arm link for a robot includes a body made of plastic material, a connection arranged on the body and adapted to be coupled to a further plastic robot arm link or a transmission part of the robot, and an insertion made of material with a higher strength or stiffness than the plastic material and embedded in the body and/or the connection. By embedding the material with higher strength or stiffness within the body of the robot arm link made of plastic material, the stiffness and strength of the robot arm link can be enhanced. In addition, due to the presence of highly rigid materials, the creep effect of the plastic arm is also significantly reduced, improving the accuracy of the robot.

17 Claims, 4 Drawing Sheets

(56) References Cited

FOREIGN PATENT DOCUMENTS

| | | | |
|---|---|---|---|
| CN | 209036550 U | 6/2019 | |
| JP | 63214429 A | 9/1988 | |
| JP | S63214429 A | 9/1988 | |
| JP | H10315349 A | 12/1998 | |
| JP | 2009190149 A | 8/2009 | |
| JP | 2009190353 A | 8/2009 | |
| JP | 2009195998 A | 9/2009 | |
| JP | 2012061545 A | 3/2012 | |
| JP | 2017047522 A | 3/2017 | |
| JP | 2018-223867 | * 11/2018 | ............. B25J 18/00 |
| JP | 2018167338 A | 11/2018 | |

* cited by examiner

PLASTIC ROBOT ARM LINK, ASSOCIATED ROBOT AND MANUFACTURING METHOD

CROSS-REFERENCE TO RELATED APPLICATIONS

This application is a national stage of International Patent Application Serial No.: PCT/CN2019/098396, filed on Jul. 30, 2019; and which is herein incorporated by reference in its entirety.

FIELD

Embodiments of the present disclosure generally relate to a plastic robot arm link as well as associated robot comprising a plurality of plastic robot arm links and a manufacturing method thereof.

BACKGROUND

Nowadays, the development of cheap robots and small and light robots gradually becomes a development trend of the robot field. Under this trend, non-metallic robots, such as plastic robots have been developed. Compared to metal material, plastic material has a high strength to weight ratio, which can lead to lightweight design of a robot if strength is concerned in a product. The strength of material refers to the ability of the material to resist damage, that is, the stress required to break the material.

In addition to the strength, an essential parameter of a component or structure is stiffness, which refers to the ability of the component or structure that is subjected to external forces to resist deformation. The stiffness is also a consideration when designing a robot. For an industrial robot, proper structure stiffness is also expected from accurate and fast motion control perspective.

However, for a structure made of plastic materials, the stiffness is very different from that of a structure made of metal material. Typically, the structure made of plastic materials has less stiffness relative to the structure made of metallic materials. Also, plastics also have a creep effect due to long-term stress, which affects the accuracy of plastic robots.

Elastic modulus (E-modulus) is a ratio of stress, below the proportional limit, to the corresponding strain. E-modulus is a measure of rigidity or stiffness of a structure. Although hybrid structures are used in some automotive parts such as bumpers, doors, etc. to increase the stiffness of the material, i.e., E-modulus, in the field of robotics, hybrid structures have not been used as the main components of the robot, such as arm links.

SUMMARY

In order to address or at least partially address the above and other potential problems, embodiments of the present disclosure provide a plastic robot arm link with a hybrid structure and associated robot.

In a first aspect, a plastic robot arm link for a robot is provided. The robot arm link comprises a body made of plastic material; a connection arranged on the body and adapted to be coupled to a further plastic robot arm link or a transmission part of the robot; and an insertion made of material with a higher elastic modulus than the plastic material and embedded in the body and/or the connection.

By embedding the material with a higher elastic modulus within the body of the robot arm link made of plastic material, the stiffness and strength of the robot arm link can be enhanced. In addition, due to the presence of highly rigid materials, the creep effect of the plastic arm is also significantly reduced, improving the accuracy of the robot.

In some embodiments, the insertion is shaped and/or arranged such that a thickness of the body or the connection is uniform. With the above arrangement, the robot arm link can be manufactured by injection molding more easily. Also, manufacturing precision can also be correspondingly improved.

In some embodiments, the insertion is made of a metal material or a composite material. In this way, the stiffness and strength of the robot arm link can be effectively improved in a cost effective manner.

In some embodiments, the insertion comprises a bearing or a metal flange embedded in the connection. As a result, on the one hand, the stiffness of the connection can be improved. On the other hand, the assembly cost of the robot arm link can be reduced.

In some embodiments, the metal flange is machined to facilitate coupling with the plastic robot arm link and with the transmission part. In this way, the components coupled to the connection can be coupled to the connection more easily.

In some embodiments, the insertion extends along an extending direction of the body. As a result, the stiffness and strength along the entire body can be effectively improved. Also, the creep of the plastic robot arm link can be further reduced, thereby improving the accuracy of the robot.

In some embodiments, the insertion is hollow with at least one reinforcing rib arranged therein. In this way, the weight of the plastic robot arm link can be reduced while keeping a relatively high stiffness and strength.

In some embodiments, the insertion is formed by sheet cutting or 3D printing. That is, the insertion can be made in any suitable way, which improves the flexibility when manufacturing the insertion.

In some embodiments, the plastic robot arm link is formed by injection molding. In this way, the manufacturing cost of the robot arm link can be reduced and the strength can be further improved.

In second aspect, a robot comprising at least one of the robot arm link as mentioned in the above first aspect is provided.

In third aspect, a manufacturing method of a plastic robot arm link is provided. The method comprises providing an insertion made of a material with a higher elastic modulus than a plastic material; injection molding a body made of plastic material to embed the insertion in at least one of the body or the connection; and providing a connection arranged on the body.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

DETAILED DESCRIPTION

Figure 1:
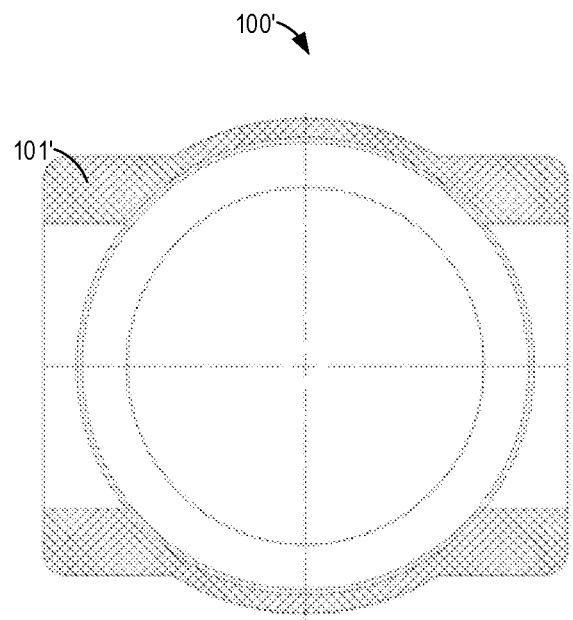
FIG. 1 shows a sectional view of a joint of a traditional plastic robot.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Robots are currently used in more and more fields. The development of cheap robots and small and light robots has met various needs of different fields. Under this trend, non-metallic robots, such as plastic robots have been developed. The use of non-metallic material such as plastic material or composite material or the like to make robots is a trend in robot development.

Compared to metal material, plastic material has a high strength to weight ratio, which can lead to lightweight design of a robot if strength is concerned in a product. The strength of a component refers to the ability of the component to resist damage, that is, the stress required to break the component. The strength of the component is related to the material and to the structure of the component.

In addition to the strength, an important parameter of the component of a robot is stiffness, which refers to the ability of a component or structure that is subjected to external forces to resist deformation. The stiffness is also a consideration when designing a robot. For industrial robot, proper structure stiffness is also expected from an accurate and fast motion control perspective.

However, for a structure made of plastic materials, the stiffness is very different from that of a structure made of metal material. As a result, the robot arm of the plastic material is prone to deformation when subjected to an external force, thereby affecting the accuracy of the robot. Also, plastics also have a creep effect due to long-term stress, which may deform the robot arm link permanently and thus further affects the accuracy of plastic robots.

Elastic modulus (E-modulus) of a material is a ratio of stress, below the proportional limit, to the corresponding strain. E-modulus is a measure of rigidity or stiffness. Although hybrid structures are used in some automotive parts such as bumpers, doors, etc. to increase the stiffness of the material, i.e., E-modulus, in the field of robot, hybrid structures have not been used as the main components of the robot, such as arm links.

Furthermore, just because of the nature of plastic material, the plastic robots have the disadvantage of not being able to withstand the fastening of metal parts, such as screws, and low thermal conductivity.

Moreover, as shown in FIG. 1, which shows a sectional view of a joint of a plastic robot we have been developed, the joint is typically made by injection molding. To ensure smooth de-molding, a wall thickness of the joint is typically uneven. On the one hand, the uneven wall thickness of the robot arm link may reduce the accuracy and strength of the robot arm link when injection molding these components. On the other hand, to allow a uniform structural wall thickness of the joint, a relatively complicated mold is required in most cases. However, it is time-consuming and challenging to design and manufacture the relatively complicated mold.

In order to solve or at least partially solve the above and other potential problems, embodiments of the present disclosure provide a plastic robot arm link with a hybrid structure. Now some example embodiments will be described with reference to FIGS. 2-6.

Figure 2:
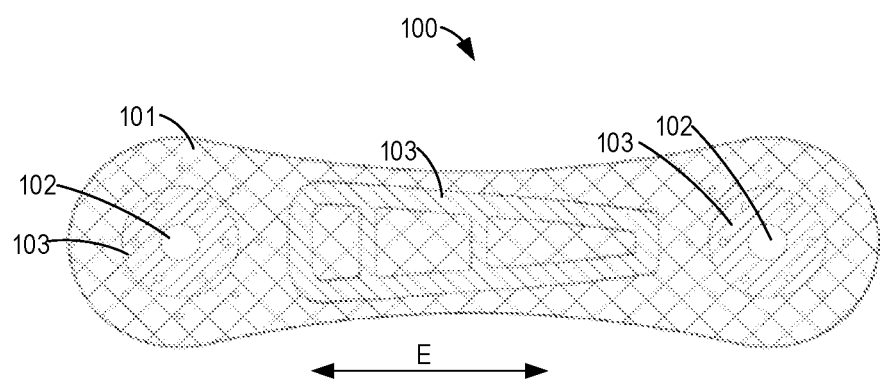
FIG. 2 shows a sectional view of a robot arm link according to embodiments of the present disclosure.
Figure 3:
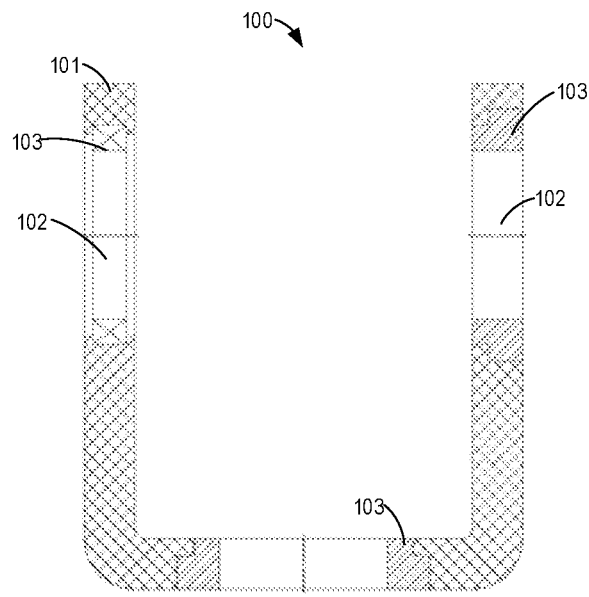
FIG. 3 shows a sectional view of a joint according to embodiments of the present disclosure.

FIG. 2 shows a sectional view of a robot arm link, such as a robot arm and FIG. 3 shows a sectional view of a joint according to embodiments of the present disclosure. As shown, in general, the plastic robot arm link 100 for a robot 200 comprises a body 101, a connection 102 and an insertion 103. The body 101, which is made of plastic material, basically forms the main shape of the arm link. In this way, the robot 200 can be made lighter and can be manufactured in a cheaper manner, which is in line with the trend of the development of the robot field.

The robot arm link 100 herein refers to a main structure of a robot, such as a robot arm, a base, a wrist, a joint or even end-effectors. In addition, the body 101, as the main structure of the robot, may be of any suitable shapes to meet the requirements of the robot. Although FIG. 2 shows that the body 101 is of a plate shape, it is to be understood that this is illustrative, without suggesting any limitations as to the scope of the present disclosure. Any suitable shapes of the body 101 may be possible. For example, in some alternative embodiments, the body 101 may be a joint and have a free-form surface or bent shapes, as shown in FIG. 3.

Figure 4:
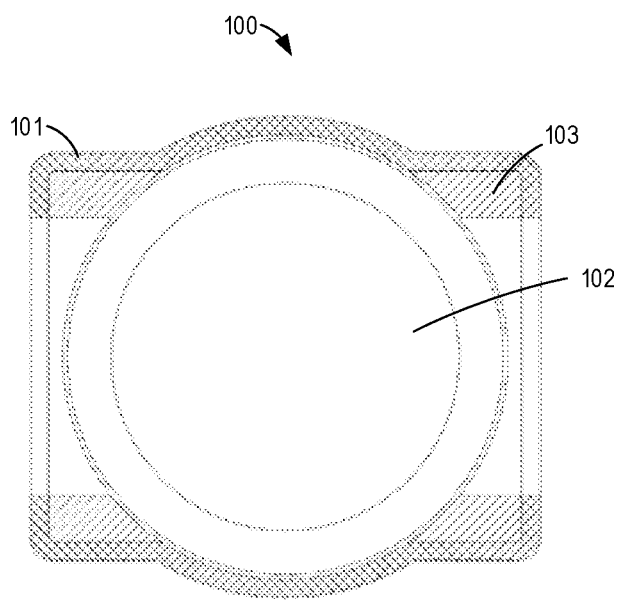
FIG. 4 shows a sectional view of a joint according to embodiments of the present disclosure.
Figure 5:
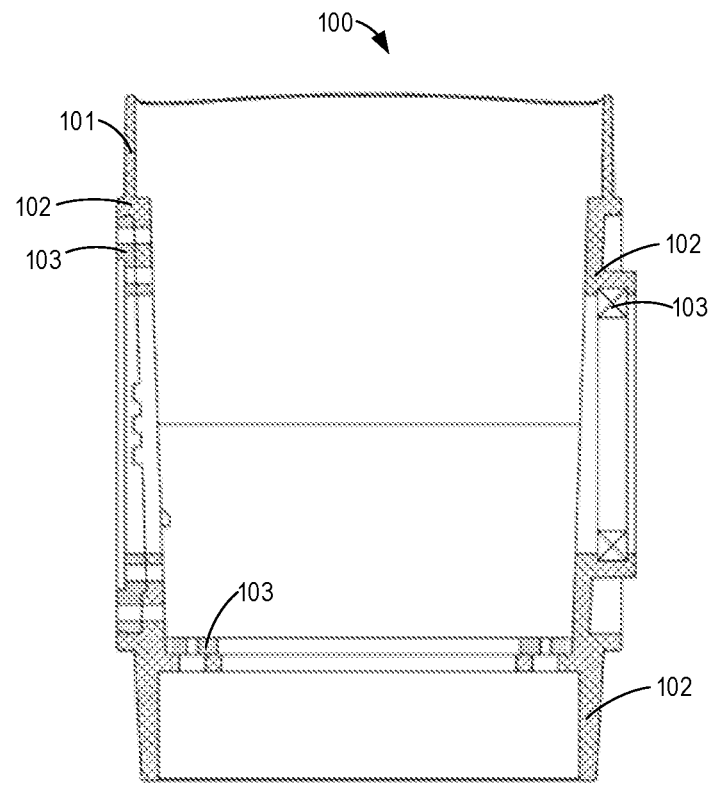
FIG. 5 shows a sectional view of a joint according to embodiments of the present disclosure.
Figure 6:
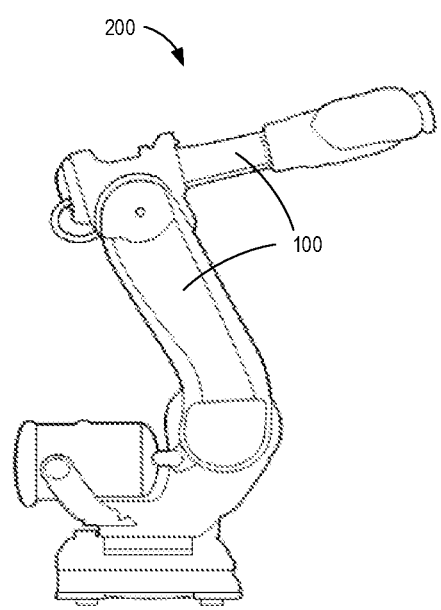
FIG. 6 shows a perspective view of a robot according to embodiments of the present disclosure.

The connection 102 is arranged on the body 101 to provide means for a further plastic robot arm link or a transmission part of the robot 200, such as a motor, a gearbox, a synchronous belt, a brake or the like to be coupled thereon. For instance, the connection 102 may be a portion arranged on the robot arm to be connected to a further robot arm or a joint, as shown in FIG. 2. In some alternative embodiments, the connection 102 may also be a portion of a joint to be connected to the robot arm or an output shaft of the motor, as shown in FIGS. 3-5.

Compared to the conventional plastic robot arm link, the plastic robot arm link 100 herein has the insertion 103 embedded in the body 101 and/or the connection 102. That is, the insertion 103 which is made of material with a higher elastic modulus than the plastic material can be applied to any suitable structures of the robot 200, such as a robot arm, a joint, a base or the like.

In this way, the overall stiffness and the strength of the robot arm link 100 may be effectively improved. Also, due to the presence of highly rigid materials, the creep effect of the plastic arm is also significantly reduced, thereby improving the accuracy of the robot 200. The insertion 103 may be formed in the plastic robot arm link 100 in any suitable ways, such as injection molding, without adding additional manufacturing costs.

For example, before the robot arm link 100 is formed by injection molding, the insertion 103 may be arranged in a suitable position in the mold. In this way, the insertion 103 may be formed in the robot arm link 100 by injection molding the robot arm link 100.

It is to be understood that the above embodiments where the robot arm link 100 with the insertion 103 is formed by injection molding are merely for illustration, without suggesting any limitation as to the scope of the present application. Any other suitable arrangements or structures are possible as well.

For example, in some alternative embodiments, the robot arm link 100 with the insertion 103 may also be formed by 3D printing. Specifically, for some robot arm links 100 with a complex structures, the body 101 may be formed with plastic material, while the insertion 103 may be formed with material with high elastic modulus when 3D printing. In this way, the plastic robot arm links 100 with a complex structure may also be formed by 3D printing.

For plastic robot arm link with an elongated structure, stiffness is especially noticeable compared to metal robot arm link. In order to improve the stiffness of the plastic robot arm link with such elongated structure, in some embodiments, as shown in FIG. 2, the insertion 103 may extend along an extending direction E of the body 101 to improve the stiffness in the extending direction E.

For plastic robot arm link with some other structures, such as L-shaped, U-shaped or the like, the insertion 103 may also have a shape following the shape or structure of the plastic robot arm link to increase the stiffness of the robot arm link in a targeted manner. Of course, the above embodiments are merely for illustration, without suggesting any limitation as to the scope of the present application. In some embodiments, the location of the insertion 103 in the body 101 may be optimized by simulation or topology design or the like.

Furthermore, the insertion 103 may also be formed in any suitable positions in the body 101 of the robot arm link 100. For example, in some embodiments, in order to make the plastic robot arm link 100 more endurable when engaged with the metal components, such as screws or bolts, insertions 103 may be arranged at the positions of the plastic robot arm link 100 where the metal components are engaged. For example, in some embodiments, metal nuts may be integrally formed in the positions of the plastic robot arm link where the screws or the bolts are engaged.

In some embodiments, for some extreme lightweight robots or structures, in order to keep the lightweight characteristics of the robots 200 without increasing the weight of the robot 200 too much when the insertion 103 is embedded, the insertion 103 may be hollow.

For the insertion 103 with a hollow structure, at least one reinforcing rib may be formed in the hollow structure to enhance the structure strength of the insertion 103 while keeping the insertion 103 and even the robot arm link 100 lightweight, as shown in FIG. 2. For the insertion 103 with a complicated hollow structure, such as a bionic structure, the insertion 103 may be formed by 3D printing.

It is to be understood that the above embodiments where insertion 103 is formed by 3D printing are merely for illustration, without suggesting any limitations as to the scope of the present application. Other suitable structures or arrangements are possible as well. For example, as mentioned above, the insertion 103 may be an off-the-shelf component, such as nuts, flanges, bearings or the like, which can further reduce the manufacturing cost of the plastic robot arm link. In some alternative embodiments, the insertion 103 may also be formed by casting, laminating, shearing or stamping or the like.

The material for forming the insertion 103 may be any suitable material with the E-modulus higher than that of the plastic material. For example, in some embodiments, the insertion 103 may be formed by metal material, such as steel, aluminum, alloy or the like. In some alternative embodiments, the insertion 103 may also be composite material, such as carbon fibers, glass fibers or the like.

Furthermore, as mentioned above, the insertion 103 may be the off-the-shelf components, such as nuts, bearings or flanges. For example, as shown in FIGS. 3 and 5, the insertion 103 may be bearings or flanges arranged on the connection 102. The bearings or flanges may be integrally formed in the body 101 by injection molding, thereby reducing the manufacturing costs of the robot arm link 100 while improving the connection strength between the insertion 103 and the connection 102.

The bearings or the flanges arranged in the connection 102 may facilitate the coupling with the robot arm link 101, a further robot arm links or other parts in the transmission system. In some embodiments, the flange may be machined to further facilitate the above coupling. For example, the flange may be machined to prevent the relative rotation between the flange and the plastic robot arm link 101. In some alternative embodiments, the flange may also be machined with teeth to engage with the transmission part, such as gears.

In some embodiments, the insertion 103 may be shaped and/or arranged to allow the thickness of the body 101 or connection 102 to be uniform, as shown in FIG. 4, which shows a sectional view of a joint. As shown, compared to the embodiments as shown in FIG. 1 and the embodiments where the complicated mold is used to ensure the uniform wall thickness of the joint, the insertion 103 is introduced to be shaped and arranged such that the thickness of the body 101 is uniform. The thickness here means that the radial distance between an outer surface and insertion 103. The uniform thickness of the body 101 allows the body 101 can be formed by injection molding more efficiently with a simple mold while improving the stiffness and strength of the body 101. Furthermore, manufacturing precision can also be improved accordingly.

It can be seen from the above that plastic robot arm link 101 with hybrid structure can have a more stiff structure while maintaining the lightweight characteristic of the plastic robot 100. In the meantime, durability of the parts of the plastic robot arm link 100 when engaging with the metal parts is improved and manufacturing difficulty and cost are reduced. In addition, due to the presence of highly rigid materials, the creep effect of the plastic arm is also significantly reduced, improving the accuracy of the robot.

Figure 7:
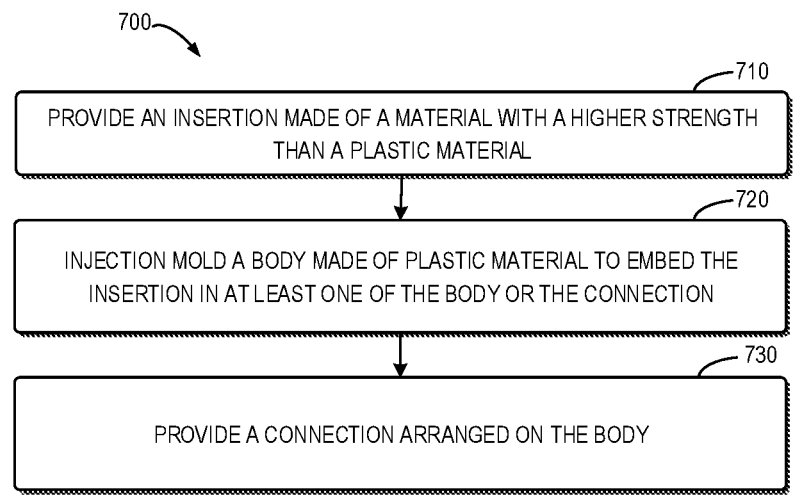
FIG. 7 shows a flowchart illustrating a manufacturing method of a plastic robot arm link according to embodiments of the present disclosure Throughout the drawings, the same or similar reference symbols are used to indicate the same or similar elements.

Embodiments of the present disclosure further provide a manufacturing method of the above mentioned plastic robot arm link 100. FIG. 7 shows a flowchart 700 illustrating a manufacturing method of the plastic robot arm link 100. As shown, in block 710, an insertion 103 made of a material with a higher E-modulus than that of a plastic material is provided.

In block 720, a body 101 made of plastic material is injection molded to embed the insertion 103 in at least one of the body 101 or the connection. In block 730, a connection 102 arranged on the body 101 is provided for example by machining or the like. In this way, the plastic robot arm link 101 with hybrid structure can have a more stiff structure while maintaining the lightweight characteristic of the plastic robot 100.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A plastic robot arm link for a robot, comprising:
   a body made of a plastic material;
   a connection arranged on the body at a first location along an extending direction of the body, the connection adapted to be coupled to a further plastic robot arm link or a transmission part of the robot; and
   an insertion made of a material with higher elastic modulus than the plastic material and embedded in the body and the connection,
   wherein the insertion comprises:
      a first shape arranged in the body at a second location along the extending direction of the body relative the first location, such that a thickness of the body is uniform, and
      a second shape arranged in the connection at the first location such that the thickness of the connection is uniform.

2. The plastic robot arm link of claim 1, wherein the insertion is made of a metal material or a composite material.

3. The plastic robot arm link of claim 1, wherein the insertion comprises a bearing or a metal flange embedded in the connection.

4. The plastic robot arm link of claim 3, wherein the metal flange is machined to facilitate coupling with the plastic robot arm link and with the transmission part.

5. The plastic robot arm link of claim 1, wherein the first shape extends along the extending direction of the body.

6. The plastic robot arm link of claim 5, wherein the first shape is hollow with at least one reinforcing rib arranged therein.

7. The plastic robot arm link of claim 1, wherein the insertion is formed by sheet cutting or 3D printing.

8. The plastic robot arm link of claim 1, wherein the plastic robot arm link is formed by injection molding.

9. A robot comprising a plastic robot arm link according to claim 1.

10. A manufacturing method of a plastic robot arm link, comprising:
    providing an insertion made of a material with a higher elastic modulus than a plastic material;
    injection molding a body made of a plastic material to embed the insertion in the body and a connection; and
    providing the connection arranged on the body at a first location along an extending direction of the body,
    wherein the insertion comprises:
       a first shape arranged at a second location along the extending direction in the body such that a thickness of the body is uniform, and
       a second shape arranged in the connection at the first location such that the thickness of the connection is uniform.

11. A robot comprising a plastic robot arm link according to claim 2.

12. A robot comprising a plastic robot arm link according to claim 3.

13. A robot comprising a plastic robot arm link according to claim 4.

14. A robot comprising a plastic robot arm link according to claim 5.

15. A robot comprising a plastic robot arm link according to claim 6.

16. A robot comprising a plastic robot arm link according to claim 7.

17. A robot comprising a plastic robot arm link according to claim 8.

* * * * *